United States Patent

Tompkins

[15] 3,664,032
[45] May 23, 1972

[54] TOOL-LEVEL INDICATOR STRUCTURE

[72] Inventor: Charles A. Tompkins, Redwood City, Calif.

[73] Assignee: Ketsy Eileen Tompkins, Redwood City, Calif. a part interest

[22] Filed: July 23, 1970

[21] Appl. No.: 57,564

[52] U.S. Cl. .................................33/207 R, 33/212, 33/213
[51] Int. Cl. ..............................................G01c 9/28
[58] Field of Search ...................33/207, 212 R, 212 A, 213, 33/214

[56] References Cited

UNITED STATES PATENTS

| | | | |
|---|---|---|---|
| 2,757,458 | 8/1956 | Zipser | 33/207 |
| 2,206,003 | 6/1940 | Donnel | 33/212 A |
| 2,806,296 | 9/1957 | Weichert | 33/207 |
| 2,452,930 | 11/1948 | Ivey | 33/207 X |
| 3,052,036 | 9/1962 | Oliver | 33/207 |

Primary Examiner—Leonard Forman
Assistant Examiner—Dennis A. Dearing
Attorney—Thomas E. Schatzel

[57] ABSTRACT

A tool for working on an object positioned at an angle relative to a reference plane, sand tool including a level indicator to indicate the angular relationship of said tool to said object and said reference plane.

2 Claims, 3 Drawing Figures

Patented May 23, 1972

3,664,032

INVENTOR.
CHARLES A. TOMPKINS
BY Thomas Schatzel

ATTORNEY

TOOL-LEVEL INDICATOR STRUCTURE

BACKGROUND OF THE INVENTION

The present invention relates to a tool and more particularly to an improved tool structure including means for indicating the position of the tool relative to a given reference plane.

There are presently numerous tools, both hand and power driven tools which require guidance along a line of action during operation on a given object. Such tools may include hand and power drills used to bore holes along a line of action in objects comprised of wood, metal or plastic; saws used to sever objects along a line of action comprised of wood, metal or plastic; etc. In various applications these tools are guided by the hands of the individual operator and it is necessary for the operator to estimate the angle at which the tool is guided relative to a reference plane to achieve the desired line of action. Obviously, the necessity of estimating places a high degree of reliance on the skill and care of the operator for accurate work.

SUMMARY OF THE PRESENT INVENTION

The present invention provides a tool structure for working on an object which structure includes a level indicator. The indicator indicates the angular position of the tool relative to a reference plane, e.g. the horizontal plane thereby informing the operator of the actual relative line of action. The level indicator is mounted on the tool in ready accessible view to the operator such that the operator may simultaneously guide the tool and view the indicator. The indicator may be mounted on adjustable means for selecting the desired relative position of the tool to the object and reference plane. A further embodiment may be adapted to indicate the angular position relative to two reference planes simultaneously.

DESCRIPTION OF PREFERRED EMBODIMENTS

Figure 1:
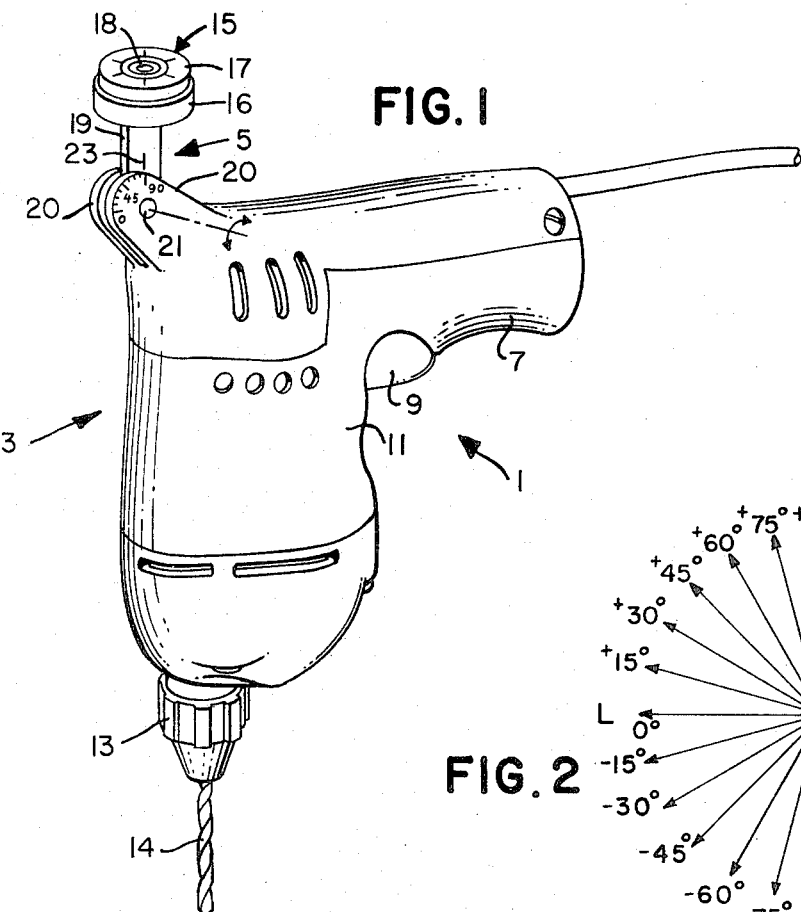
FIG. 1 is a perspective view of a power drill structure incorporating the teachings of the present invention.

FIG. 1 illustrates a tool structure referred to by the general reference character 1 and incorporating the teachings of the present invention. The structure 1 comprises a portable electric power hand drill 3 having mounted thereon a level indicator assembly referred to by the general reference character 5. Hand drills, such as the drill 3 are commonly used to drill or bore holes in wood, metal or plastics. In addition, with the great number of accessories and attachments available the drill can be converted into a number of different tools including a portable sanding machine, grinder, buffer, filing machine, circular saw, reciprocating saw for metal or wood, shears for cutting sheet metal, power-driven screw driver, etc. The drill 3 includes a handle 7, a trigger switch 9, a casing 11 and a chuck 13. In FIG. 1 the tool carries a bit 14 such that a hole may be drilled along a line of action coinciding with the axis of the bit 14.

The level indicator assembly 5 is mounted on the back of the casing 11 near the juncture with the handle 7 for continuously indicating the position of the line of action of the drill relative to a horizontal reference plane. The level indicator assembly 5 includes a bubble level 15 having a circular-disc shaped housing 16 with a transparent cover 17 and filled with ether, alcohol or the like to leave an air bubble 18 which moves to the center of the housing 16 when the housing is on an even horizontal reference plane. The housing 16 is secured to an extension arm 19 pivotally secured to a brace 20 secured to the casing 11. A pin 21 secures the arm 19 and brace 20 relative to one another permitting the arm 19 to be rotated about the axis of the pin.

Figure 2:
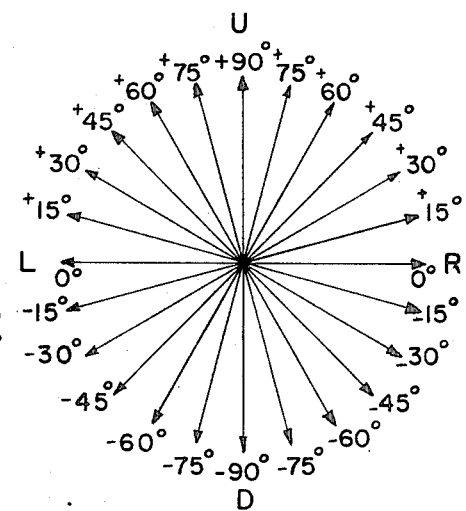
FIG. 2 is a diagram indicating the selective positions of the structure of FIG. 1 relative to a single reference plane.

The level indicator assembly 5 is such that it may be pivoted to various positions about the axis of the pin 21 which is fixed relative to the tool 3 and the line of action of the tool. As illustrated in FIG. 1, the level assembly 5 is positioned such that the tool 3 may be used to drill or bore holes at a perpendicular angle relative to the horizontal. Accordingly, a workman holds the drill continuously viewing the level and guiding the drill such that the bubble retains a center position. The level indicator assembly 5 assumes the same position whether the drill is guided upward or downward relative to the reference plane. If it is desired to drill a hole along a plane parallel with the horizontal, the housing 16 and arm 19 are adjusted by rotating the arm 19 90° about the pin 21. Thus, the line of action of the tool is then parallel with the plane of the housing 16. Accordingly, a workman holds the structure 1 continuously viewing the bubble 18 and guiding the drill such that the bubble retains a center position while working on the object. To facilitate setting of the desired angle the arm 19 carries a reference mark 23. The brace 20 carries a plurality of reference marks indicating a scale marked 0°, 45° and 90° with intermediate marks positioned each 15° to permit indications of the angular relationship between the line of action of the tool and the horizontal reference plane. For example, if it is desired to drill a hole along a line in a plane 45° relative to the horizontal reference, the reference mark 23 is aligned with the 45° mark. Viewing the orthogonal axis "X" and "Y" of FIG. 2 the tool may be guided along any line of action within any one of the four quadrants and the level indicator assembly 5 will indicate whether the actual line of action coincides with the desired preset by the scale by viewing the position of the bubble 18 within the casing 16. The circular bubble level 15 indicates to the operator that only whether the line of action is off line relative to the reference but also the direction of connection necessary to realize the desired line.

Figure 3:
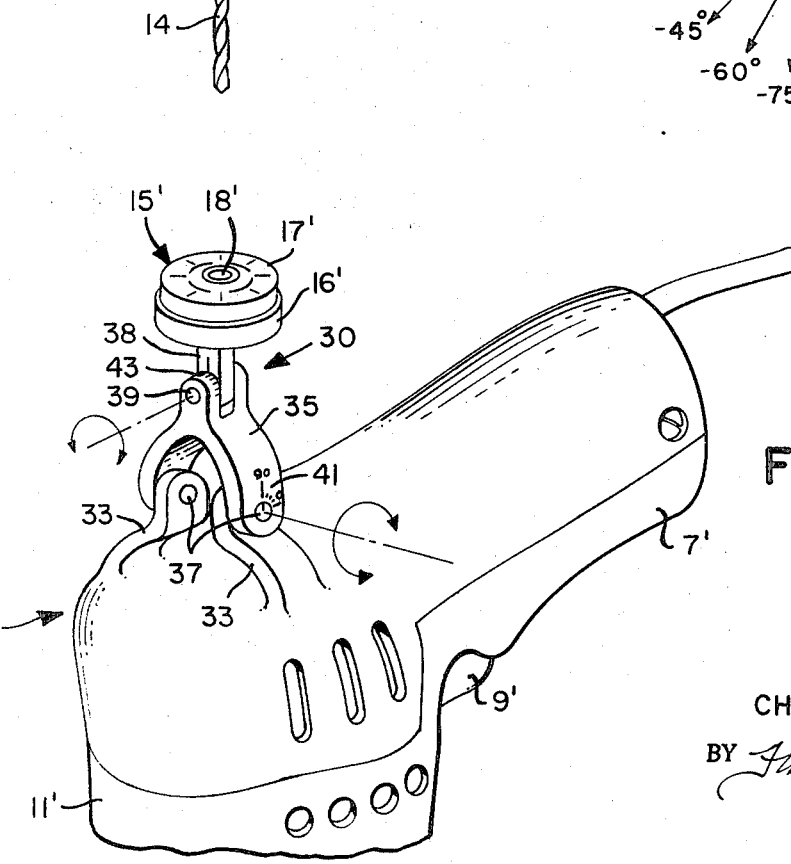
FIG. 3 illustrates a level attachment for a hand tool to indicate the position of the structure relative to two reference planes.

FIG. 3 illustrates a further embodiment of the present invention including a level indicator assembly referred to by the general reference character 30. The assembly 30 is mounted on a power drill 3' having a handle 7', switch 9' and casing 11'. The assembly 30 is designed so as to provide an indication of the line of action relative to two reference planes, e.g. a vertical and horizontal. The assembly 30 includes a brace 33 adapted to be secured to the casing 11' of the tool 3'. The brace 33 is secured to a wishbone shaped bracket 35 joined about a pair of fixed coaxial pivots 37 to allow the bracket 35 to be pivoted relative to a horizontal reference plane. The bracket 35 is joined to an extension arm 38 about a fixed pivot 39 permitting the arm to be pivoted relative to the vertical reference plane. Joined to the end of the arm 38 is a bubble level 15' similar to level 15 of FIG. 1 having a housing 16' and a cover 17' filled with ether, alcohol or the like to leave an air bubble 18'.

Accordingly, the bubble level 15' is pivotable about two different axis each fixed relative to the line of action of said tool. Geometrically viewing the axis of the fixed pivot 37 is coinciding with an "x" axis and viewing the axis of the fixed pivot 39 as coinciding with the "z" axis, the bubble level 15' may be preset in accord with a pair of scales 41 and 43, carried on the braces 35. The pivot 37 carries a reference mark as does the arm 38 to accommodate said scales. Accordingly, the scales and marks may be preset to accommodate the desired angular relationship relative to the horizontal and vertical planes. The tool 3' is then guided such that the bubble 18' retains a center position.

I claim:

1. A tool structure comprising, in combination:
   a drill operable along a line of action, said line of action being variable to any one of various positions relative to a given planar reference;
   a level indicator means including a bubble level for indicating the line of action of said tool relative to said planar reference; and
   position adjustment means for varying the relative position of said level indicator means relative to said drill, the position adjustment means including a first arm and a second arm, the level indicator means being engaged to said first arm about one terminal end of said first arm, said first arm being interconnected about the other terminal end with said second arm about a first pivot having an axis perpendicular to the line of action of the tool, said first arm being adapted to be pivoted about said axis of said first pivot, first means for determining the relative position of said first arm about said first pivot said second arm being interconnected with said first arm about the axis of said first pivot and with the drill about a second pivot point, said second pivot having an axis perpendicular to the line of action of the tool and perpendicular to the axis of said first pivot, said second arm being adapted to be pivoted about said second pivot second means for determining the relative position of said second arm about said second pivot.

2. The tool structure of claim 1 further said first relative position determining including a first angular scale adapted to indicate the angular relationship of said first arm relative to the axis of said first pivot and said second relative position determining means including a second angular scale adapted to indicate the angular relationship of said second arm relative to the axis of said second pivot.

* * * * *